Feb. 16, 1943.　　　S. N. SILVERSTONE　　　2,311,580
FLUID DRIVE
Filed Dec. 13, 1941
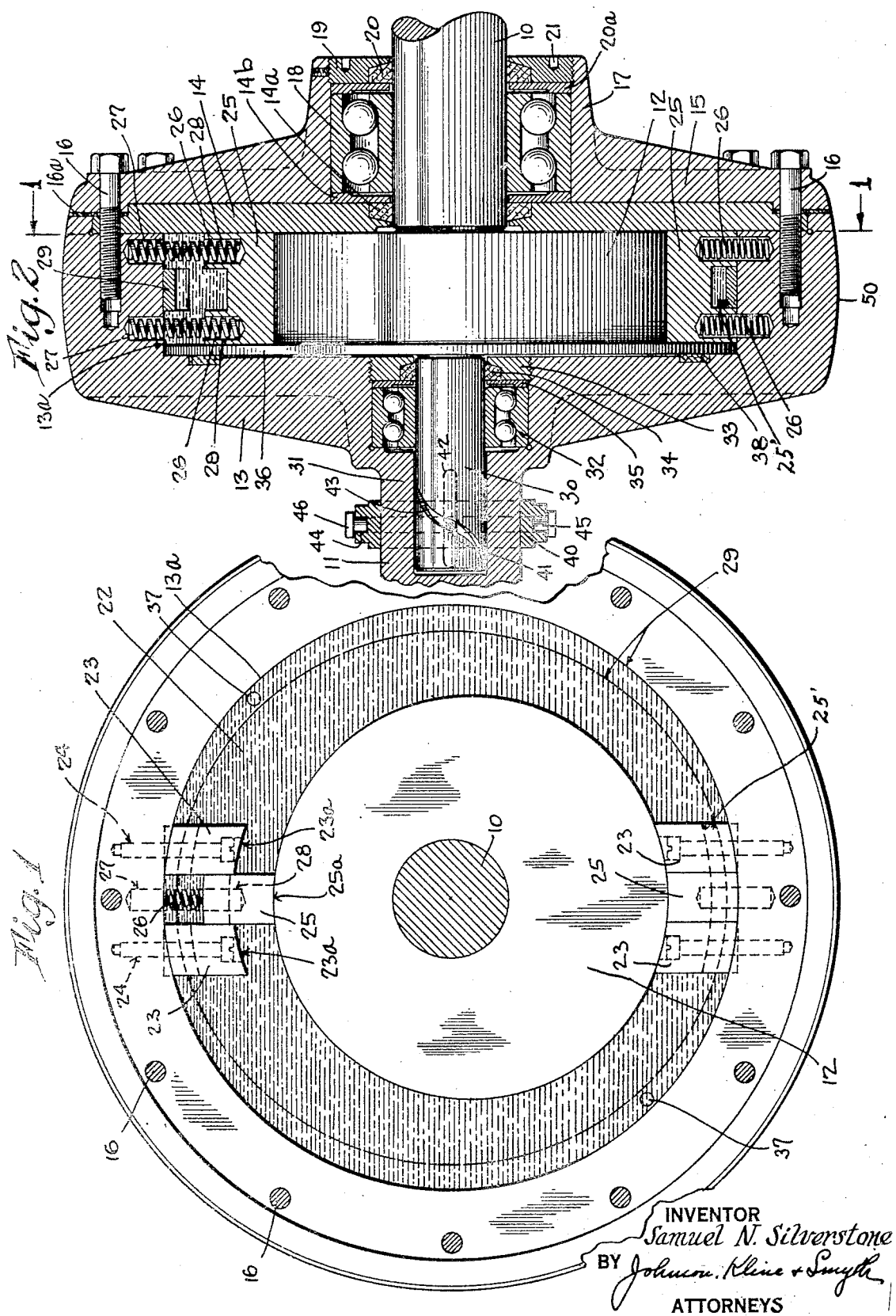
INVENTOR
Samuel N. Silverstone
BY Johnson, Kline & Smyth
ATTORNEYS Patented Feb. 16, 1943

2,311,580

UNITED STATES PATENT OFFICE 2,311,580

FLUID DRIVE

Samuel N. Silverstone, Bridgeport, Conn.

Application December 13, 1941, Serial No. 422,819

13 Claims. (Cl. 192—58)

The present invention relates to improvements in a simple and compact fluid driving connection capable of readily being operated to vary the drive therethrough in small steps.

Heretofore, it has been proposed to provide a fluid drive in which a drive member on the driving shaft is disposed in a chamber in the driven member so as to operate on the fluid therein to form the driving medium between said members. Such constructions have been involved or complicated devices or have included an eccentric member which, in order to vary the drive, it was necessary to bodily shift so as to reduce its eccentricity and permit a free flow of fluid without compression. This adjustment was difficult, as it necessitated the movement of a substantial mass of fluid.

According to the present invention, a fluid drive is provided which is simply constructed and readily controlled by the shifting of a valve which produces a minimum of fluid displacement while permitting minute variations in the drive through the connection.

The fluid carrying chamber may be subdivided by partition walls into smaller chambers so that quick drive through the connection is possible. By controlling the flow of fluid between the chambers the speed and torque applied to the driven member can be readily controlled.

A feature of the present invention is the means whereby the interconnection between the small chambers can be easily and quickly modified to vary the flow therebetween during operation of the drive in transmitting power from a driving shaft to a driven shaft.

The drive of the present invention may be used to transmit power from a driving shaft to a driven shaft, or, in its broader aspects, to transmit power from a driving shaft to a driven member, for example, a pulley which in turn will transmit the power to other instrumentalities.

The drive of the present invention is operable in either direction of rotation and may be used as a braking means should the driven member be held against rotation.

Other features and advantages will be apparent from the specification and claims when considered in connection with the drawing, in which—

Figure 1 is a view, partly in section, taken in the direction of arrows 1—1 of Fig. 2, showing the casing with the cover and wall removed.

Fig. 2 is a view of the device showing a longitudinal section of the casing and wall structure.

In the drawing, the fluid drive of the present invention is shown as forming a driving connection between a driving shaft 10 and a driven shaft 11.

The driving shaft 10 has a disk 12 eccentrically mounted on the end thereof and the driven shaft 11 has secured thereto a casing 13 provided with a recess 13a to receive the disk as shown in Fig. 2. The side walls of the recess are spaced from the edge of the disk and are concentric with the drive shaft. The open side of the recess is closed by a wall 14 closely engaging the face of the disk and having a fluidtight seal 14a surrounding the drive shaft 10 which is pressed into position by a washer 14b. An outer cap or cover 15 for the casing is disposed over the side wall 14 and is clamped to the casing by means of the bolts 16 disposed about the casing, the bolts passing through the edge of the wall 14 and being threaded into the rim of the casing. The joint between the cap and casing is sealed by a gasket 16a clamped therebetween.

The cap 15 has an enlarged hub 17 projecting from its face and a ball-bearing 18 is disposed therein so as to rotatably support the casing on the driving shaft. The bearing is held in position by a lock nut 19, and the opening about the shaft is sealed by a sealing member 20 carried in a recess in the nut 19 and compressed against a washer 20a.

The lock nut is provided with holes 21 to receive a spanner wrench or other tool by which it may be screwed into the hub to lock the bearing in position and seal the opening about the shaft.

As is shown in Fig. 1, the chamber formed by the recess 13a in the casing is considerably larger than the eccentrically mounted disk disposed therein and the space between the two is filled with a driving fluid 22. In the illustrated form of the invention, the chamber is divided into a plurality of subchambers by dividing walls. Two such walls are illustrated, though it is to be understood that more may be used if desired. Each dividing wall comprises a pair of wall sections 23 extending for the full distance across the chamber and being rigidly secured to the wall of the recess 13a by bolts 24 and so spaced as to receive a sliding wall member 25 between them. The sliding wall member, which is the same width as the other wall sections, is urged away from the walls of the recess and into engagement with the edge of the disk 12 by a pair of springs 26 having their ends disposed in pockets 27 in the wall of the casing and pockets 28 in the sliding wall.

As best shown in Fig. 1, the faces 23a and 25a of the wall sections are curved so as to have good contact with the disk when in engagement therewith so that the walls prevent the flow of fluid between the chambers in all positions of the disk.

It will be noted that when the disk is rotated, it will tend to compress the fluid confined in the chamber. As soon as the fluid is compressed, it forms a driving connection between the disk and the casing and causes the casing to rotate and drive the shaft attached thereto at the same speed as the driving shaft.

Theoretically, if the fluid could be permitted to circulate freely and not be compressed by the action of the eccentrically mounted disk, no motion would be transmitted to the casing. According to the present invention, the partition walls are provided with ports 25' of sufficient size as to permit a substantially free flow of fluid therein.

However, from a practical standpoint, the flow of fluid cannot be made absolutely free due to the manner in which the ports must be provided in the partition walls and due to the friction of the fluid as it flows in the casing and will provide a minimum of torque. If the driven shaft is connected to mechanism to drive the same, usually the mechanism will have sufficient friction or mass to overcome this driving torque so that the casing will remain stationary.

If the torque is sufficient to rotate the casing, however, a friction brake of the band type (not shown) may be applied to the outer surface of the hub 17 or to the periphery of the casing to hold it against movement.

The torque and speed of the casing can be varied from this minimum value to full value by regulating the opening of the ports and controlling the flow of fluid in the casing.

In order to control the amount of port opening, a novel sliding valve mechanism is used. This valve, as best shown in Fig. 1, comprises a ring 29 passing through the ports and having its outer surface cylindrical and in sliding engagement with the side walls of the recess in the casing. The ring is progressively thickened from opposite low points and forms an inner elliptical surface. In the position shown in Fig. 1, there will be a maximum opening of the port. As the ring is moved in either direction, the thickened portion will enter the opening and the port will be decreased and the amount of pressure in the fluid increased. This adjustment can be readily made since the valve can be slipped around the casing as it is adjusted and does not require movement of a mass of fluid. The means for shifting the ring as herein illustrated comprises a stub shaft 30 mounted in a bore in a central boss 31 on the casing and connected to the driven shaft. The bore opens into the bottom of the circular disk-receiving recess 13a and is in alignment with the drive shaft. The stub shaft is mounted for rotation with respect to the casing by a ball-bearing 32 disposed in an enlargement of the bore. The bearing is locked in position by a lock nut 33 which also compresses a packing material 34 against a washer 35 and forces it into engagement with the shaft 30 for sealing the chamber.

The outer end of the stub shaft carries a plate 36 which extends over the bottom of the recess of the casing and is connected by suitable pins 37 to the valve ring. The plate bears against the casing only at its outer periphery and has a minimum of contact therewith so that it will have a minimum of friction and can be readily rotated and adjusted. A sealing gasket 38 is disposed between the plate and the casing to seal against the passage of fluid from the chamber.

While the plate may be rotated by any suitable means, the present preferred form of invention provides a collar 40 mounted on the boss 31. The collar has a pin 41 extending through a longitudinally extending aperture 42 in the boss and passing into a spiral groove 43 in the stub shaft.

The collar is provided with an annular recess 44 for receiving the usual pins 45 carried by a forked lever 46 whereby it can be shifted longitudinally of the boss while at the same time be free to rotate with the casing.

When the collar is moved longitudinally of the boss, the pin 41 will act on the walls of the spiral groove on the stub shaft and cause said stub shaft and plate connected thereto to rotate relative to the casing and shift the valve to an open or closed position as required to provide for proper speed variations.

A suitable plug (not shown) may be provided in the casing, if desired, for supplying the fluid to the chamber without requiring dismantling of the casing.

While the invention has been discussed as the driving means between two shafts, in its broader aspects it may form the driving means for other devices. For example, the outer end of the shaft 11 may be mounted in bearings and the periphery 50 of the casing, which is shown as crowned, be used as a pulley for driving a belt. Also, by providing suitable means for holding the casing against rotation, the fluid connection may be used to break or retard rotation of the driving shaft.

It is to be noted that the driving connection is operative in either direction of rotation of the drive shaft to impart rotation of the driven shaft and the speed may be varied by very small steps while in operation.

Variations and modifications may be made within the scope of this invention and portions of the improvements may be used without others.

I claim:

1. A fluid drive transmission comprising a rotatable shaft; a disk eccentrically mounted on the shaft to rotate therewith; a driven casing mounted on the shaft for rotation with respect thereto, said casing having a recess therein forming a chamber concentric with the shaft and surrounding the disk; driving fluid in said chamber to be acted upon and compressed by said disk and drive said casing; and means including a ring valve for controlling the flow of fluid in said chamber to vary the amount of compression of said fluid and the torque and speed of the casing.

2. A fluid drive transmission comprising a rotatable shaft; a disk eccentrically mounted on the shaft to rotate therewith; a driven casing mounted on the shaft for rotation with respect thereto, said casing having a recess therein forming a chamber concentric with the shaft and surrounding the disk; driving fluid in said chamber to be acted upon and compressed by said disk and drive said casing; a ring-shaped valve slidably carried by the walls of the casing for controlling the flow of fluid in said chamber; and means for rotating said valve to shift the position thereof to vary the flow of fluid and change the amount of compression of said fluid and the torque and speed of the casing.

3. A fluid drive transmission comprising a rotatable shaft; a disk eccentrically mounted on the shaft to rotate therewith; a driven casing mounted on the shaft for relative rotation with respect thereto, said casing having a recess therein forming a chamber concentric with the shaft and surrounding the disk; driving fluid in said chamber, said chamber being divided by partitions extending from the disk to the casing whereby rotation of said eccentrically mounted disk compresses the driving fluid in the chamber and causes the casing to be rotated; means including ports in said partitions for connecting the divided chambers; and means associated with said ports for controlling the flow of fluid through said ports to vary the amount of compression of said fluid and the speed of the casing.

4. A fluid drive transmission comprising a driving shaft having a disk eccentrically mounted thereon to rotate therewith; a casing mounted on the driving shaft for rotation thereon and connected to a driven shaft, said casing having a recess therein forming a chamber concentric with the shaft and surrounding the eccentric; driving fluid in said chamber to be acted upon and compressed by said disk to cause said casing to be rotated; means including walls extending from the casing to the disk for dividing the chamber into a plurality of smaller chambers; means for interconnecting said smaller chambers to permit fluid to flow therebetween; and means associated with said ports for controlling the flow of fluid between said smaller chambers to vary the amount of compression of said fluid and the speed of the casing.

5. A fluid drive transmission comprising a rotatable shaft; a disk eccentrically mounted on the shaft to rotate therewith; a driven casing mounted on the shaft for rotation with respect thereto, said casing having a recess therein forming a chamber concentric with the shaft and surrounding the disk, said chamber being divided into smaller compression chambers; driving fluid in said chambers to be acted upon and compressed by said disk and drive said casing; means including a ring valve for controlling the flow of compressed fluid from said chambers to vary the amount of compression of said fluid and the torque and speed of the casing; and means for varying the position of the ring valve during operation of the transmission.

6. A fluid drive transmission comprising a rotatable shaft; a disk eccentrically mounted on the shaft to rotate therewith; a driven casing mounted on the shaft for relative rotation with respect thereto, said casing having a recess therein forming a chamber concentric with the shaft and surrounding the disk; driving fluid in said chamber, said chamber being divided by partitions, each including a pair of fixed walls having a slidable wall therebetween and resilient means for urging the slidable wall into tight engagement with the edge of the disk to prevent the flow of fluid thereby, rotation of said eccentrically mounted disk compressing the driving fluid in the chamber and causing the casing to be rotated; means including aligned ports in said walls for connecting the divided chambers; and means for controlling the flow of fluid through said ports to vary the amount of compression of said fluid and the speed of the casing.

7. A fluid drive transmission comprising a rotatable shaft; a disk eccentrically mounted on the shaft to rotate therewith; a driven casing mounted on the shaft for rotation with respect thereto, said casing having a recess therein forming a chamber concentric with the shaft and surrounding the disk, said chamber being divided into smaller chambers; driving fluid in said chambers to be acted upon and compressed by said disk and drive said casing; and means including a ring valve for controlling the flow of compressed fluid from said chambers and a member rotatably mounted on the casing and connected to the valve to rotate the same and shift the position thereof to vary the amount of compression of said fluid and the torque and speed of the casing.

8. A fluid drive transmission comprising a rotatable shaft; a disk eccentrically mounted on the shaft to rotate therewith; a driven casing mounted on the shaft for relative rotation with respect to the shaft, said casing having a recess therein forming a chamber concentric with the shaft and surrounding the disk; driving fluid in said chamber, said chamber being larger than the eccentric and divided by partitions including a fixed wall and a sliding wall normally urged into engagement with the edge of the disk to prevent a flow of fluid, whereby rotation of said eccentric compresses the driving fluid in the chamber and causes the casing to be rotated, said walls having ports therein whereby fluid may flow between divisions of said chamber; and means for controlling the flow of fluid through said ports to vary the amount of compression of said fluid and the speed of the casing.

9. A fluid drive transmission comprising a rotatable shaft; a disk eccentrically mounted on the shaft to rotate therewith; a driven casing mounted on the shaft for relative rotation with respect thereto, said casing having a recess therein forming a chamber concentric with the shaft and surrounding the disk; driving fluid in said chamber, said chamber being divided into a plurality of small chambers, rotation of said eccentrically mounted disk compressing the driving fluid in the chambers and causing the casing to be rotated; means including ports adjacent the walls of the chamber for connecting the small chambers for the passage of fluid therebetween; and means for controlling the flow of fluid through said ports comprising a ring passing through the ports and having one surface sliding on the wall of the chamber and an opposite surface progressively changing to increase the thickness of the ring so as to change the opening of the port upon movement of the ring and vary the amount of compression of said fluid and the speed of the casing.

10. A fluid drive transmission comprising a rotatable shaft; a disk eccentrically mounted on the shaft to rotate therewith; a driven casing mounted on the shaft for rotation with respect thereto, said casing having a recess therein forming a chamber concentric with the shaft and surrounding the disk; driving fluid in said chamber to be acted upon and compressed by said disk and drive said casing; a ring valve slidably carried by the walls of the casing for controlling the flow of fluid in said chamber; a rotatable stub shaft carried by the casing and having a plate secured thereto and overlying the bottom of the recess, said plate being connected to the ring valve; and means for rotating the stub shaft to cause said plate to shift said ring valve to vary the amount of compression of said fluid and the torque and speed of the casing.

11. A fluid drive transmission comprising a rotatable shaft; a disk eccentrically mounted on the shaft to rotate therewith; a driven casing rotatably mounted on the shaft, said casing having a chamber concentric with the shaft and surrounding the disk; driving fluid in said chamber, said chamber being divided by partitions whereby rotation of said eccentrically mounted disk compresses the driving fluid in the chamber and causes the casing to be rotated; means including ports in said partitions for connecting the divided chambers; and means for controlling the flow of fluid through said ports to vary the amount of compression of said fluid and the speed of the casing comprising a ring valve of increasing thickness passing through the ports and means for shifting said valve to change the opening of the port.

12. A pulley comprising a rotatable casing having a belt-receiving surface about its periphery and a central recesss therein forming a chamber having a plurality of compartments; a drive shaft having an eccentrically mounted disk thereon, said disk being located in the chamber; driving fluid in said chamber, rotation of said eccentrically mounted disk compressing the fluid and driving the casing; and means including a ring valve for controlling the flow of fluid between the compartments to vary the compression of said fluid and the torque and speed of the pulley.

13. A pulley comprising a rotatable casing having a belt-receiving surface about its periphery and a central cavity; a drive shaft projecting into the cavity and centrally located therein; a disk eccentrically mounted on the drive shaft within the cavity; driving fluid in the cavity to be acted upon and compressed by the disk and drive the casing, said cavity being divided by partition walls extending between the casing and disk into a plurality of compartments; means including ports in said walls for connecting the plurality of compartments; and means associated with said ports for controlling the flow of fluid through the connecting means to vary the amount of compression of said fluid and the speed of the pulley.

SAMUEL N. SILVERSTONE.